Sept. 24, 1929.  F. J. FAHLE  1,728,962
POWER TRANSMISSION MECHANISM
Filed May 19, 1927   3 Sheets-Sheet 1
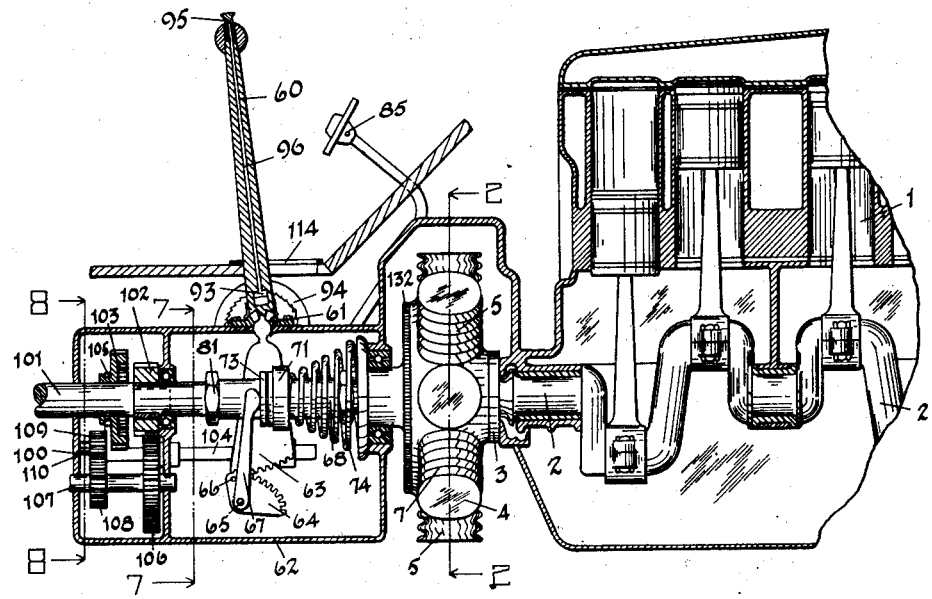
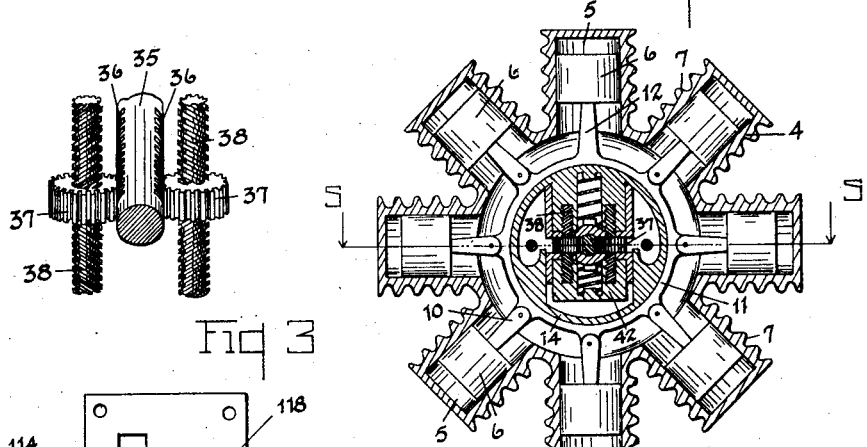
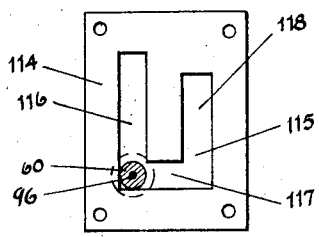
Inventor
Fredrick J. Fahle

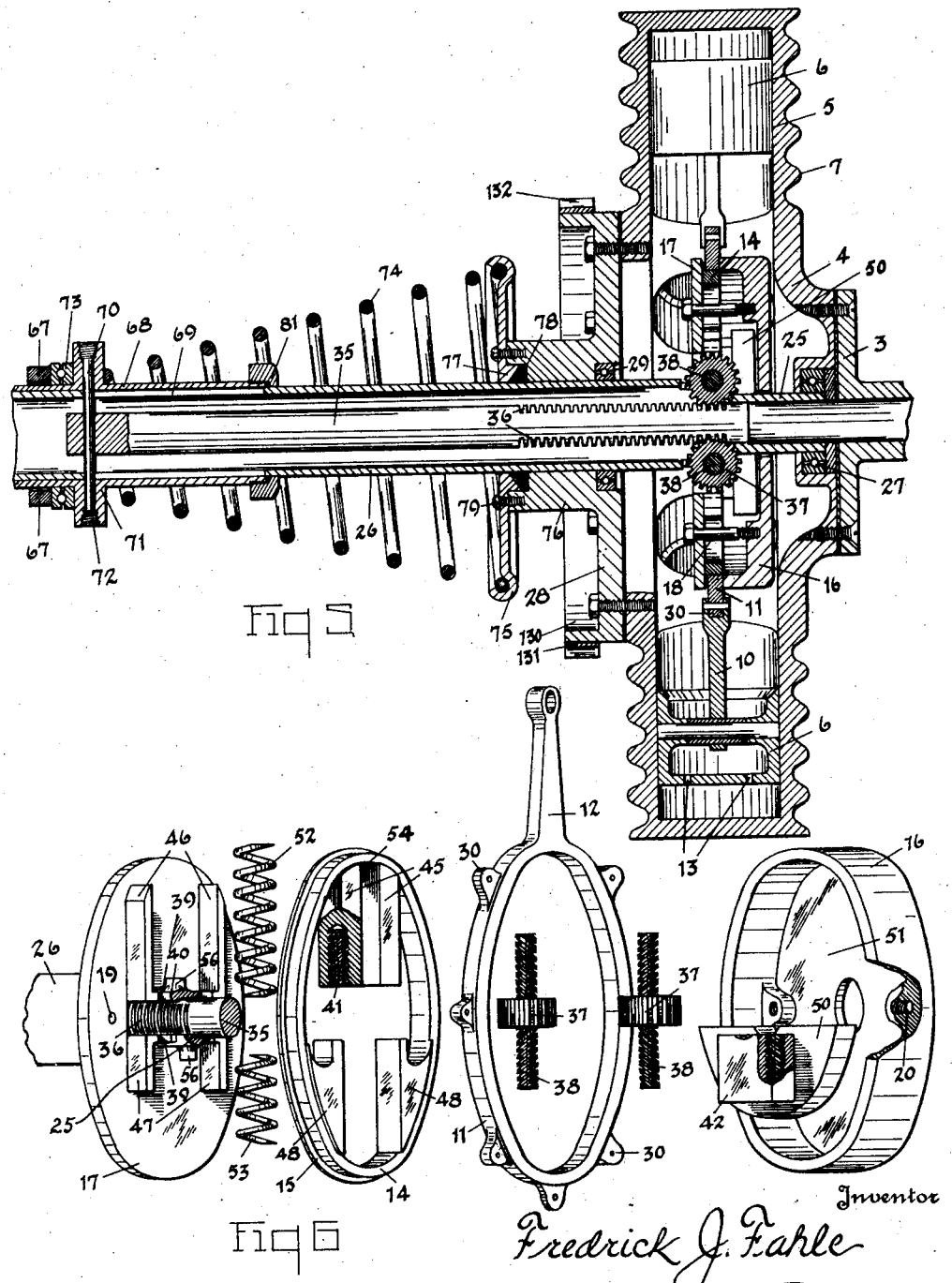

Sept. 24, 1929.   F. J. FAHLE   1,728,962
POWER TRANSMISSION MECHANISM
Filed May 19, 1927   3 Sheets-Sheet 3
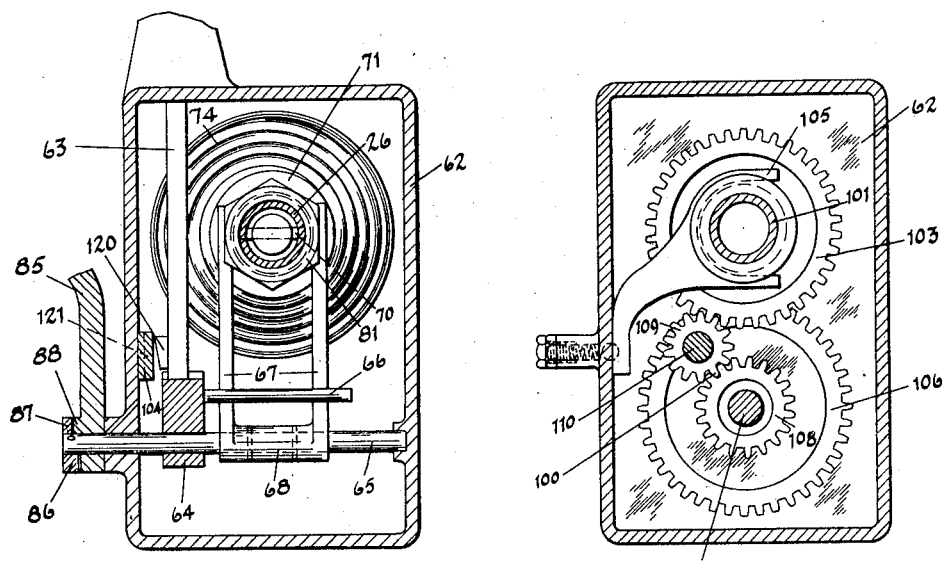
Fig 7   Fig 8
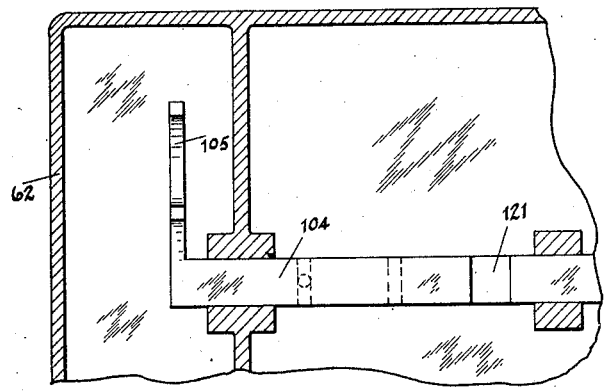   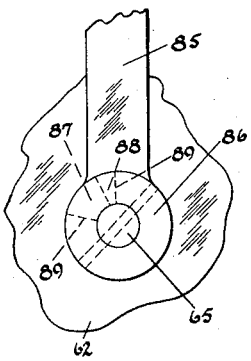
Fig 9   Fig 10
Inventor
Fredrick J. Fahle
By Faust F. Crampton
Attorney Patented Sept. 24, 1929

1,728,962

UNITED STATES PATENT OFFICE

FREDRICK J. FAHLE, OF TOLEDO, OHIO

POWER-TRANSMISSION MECHANISM

Application filed May 19, 1927. Serial No. 192,571.

My invention has for its object to provide a power transmission device between driving and driven members of any mechanical system whereby speeds may be selected as may be desired and varied in very slight gradations from one into the other. The invention particularly provides means whereby the driven shaft or member may be operated at desired speeds.

The invention also provides a means whereby a clutch connection may be obtained through the transmission mechanism and thus the transmission and the clutch connection, as between the driving and driven members, may be operated and controlled by the same controlling means.

The invention thus provides a means for transmission of power and for clutch connecting driving parts of a mechanism with driven parts and wherein stripping of gears is entirely obviated and noise of transmission is eliminated, the said means being so constructed that both the transmission and the clutch arrangements may be easily manipulated by a single controlling member.

The invention also has for its object to provide other features and secure other advantages which will appear from the following description and upon examination of the drawings.

The invention may be contained in transmission devices and in clutch mechanisms, either separately or combined as a unit and controlled by separate actuating means or controlled by common controlling devices and of different forms, and may be used for a great variety of purposes. To illustrate a practical application of the invention, I have selected a construction containing the invention as an example of the various structures that embody the invention and shall describe the structure selected hereinafter. The particular structure referred to is shown in the accompanying drawings.

Fig. 1 is a vertical longitudinal section taken substantially through the axis of the driven and driving shafts of a combined hydraulically operated transmission and clutch mechanism embodying my invention and selected for purposes of illustration. Fig. 2 is a view of a section taken on the plane of the line 2—2 indicated in Fig. 1. Fig. 3 is a perspective view of details of a device for controlling pistons that hydraulically operate the transmission and clutch mechanism. Fig. 4 is a top view of a guide plate for the transmission controlling lever. Fig. 5 is a view of a section taken on the plane of the line 5—5 indicated in Fig. 2. Fig. 6 is a view of parts of the piston adjusting mechanism shown disassembled and indicates by their relative location in the figure their relation in a general way when assembled. Fig. 7 is a view of a section taken on the plane of the line 7—7 indicated in Fig. 1. Fig. 8 is a view of a section taken on the plane of the line 8—8 indicated in Fig. 1. Fig. 9 illustrates a slide used for shifting the reverse gear. Fig. 10 illustrates a side view of the pedal lever for controlling the transmission when making a reverse gear connection through the driven shaft.

In the particular form of construction shown in the drawings, the power transmission may be made through any form of fluid, preferably, a liquid that is non-evaporative at ordinary temperatures and one that will not readily congeal in very cold weather, hence, a light oil or glycerin cut with alcohol may be used for the transmission of the power. The liquid is contained in a container in which a body is caused to move against the resistance of the movement of the liquid. In the preferred form of the invention, a plurality of cylinders that are interconnected and in which are located a plurality of pistons, are used, means being provided for altering the location of the pistons with reference to the axis of rotation of a driven shaft to vary the stroke of the pistons which are connected to the driven shaft. In the operation of the pistons the liquid is transferred by the pressure created from one side of the piston to the opposite side of the piston within the cylinder and their intercommunicating passageways.

Thus my invention provides for the transmission of the power from a driving member to a driven member through the rotation of the cylinders and pistons and reciprocatory movements of the pistons in the cylinders, changes of speed being obtained by variation of the stroke of the pistons which are connected to the driven shaft, the lost motion between the driven shaft and the driving shaft being varied from maximum to zero to produce changes from the highest to the lowest speed in the driven shaft, the former being substantially the speed of the driving shaft and the latter being equivalent to the disconnection between the driving shaft and the driven shaft. This variation and movement of the pistons within the cylinders is accomplished by varying the eccentricity of the connecting points of the pistons with the driven shaft which is coaxially located relative to the driving shaft.

In the particular form of construction of the mechanism, the internal combustion engine 1 is provided with a crank shaft 2, which is the driving shaft of the mechanism, which terminates in a connector flange 3. The connector plate 3 is connected to a casing 4 having formed integral therewith a plurality of cylinders 5. A piston 6 is located in each of the cylinders and the pistons 6 are movable radially with respect to the driving shaft. The casing 4 is adapted to contain a suitable liquid, and the cylinders 5 may be corrugated as at 7 to provide a cooling means to maintain the liquid at approximately atmospheric temperatures. As the pistons perform their reciprocatory movements in radial directions, the liquid, located in the casing 4 and its connected cylinders 5, is forced by or through the pistons 6. In the particular form of construction shown, the pistons 6 are so constructed to quite freely move in the cylinders 5 and are provided, in their ends, with openings 13 of desired size so that the combined areas of the openings 13 and the spaces between the pistons and cylinders will allow movement of the liquid and yet produce the desired yielding resistance of the pistons in the liquid.

The pistons 6 are connected by means of a plurality of links 10 with a ring 11. If desired an arm 12 may be substituted for the corresponding link of one piston in order to prevent creeping of the ring 11 relative to the casing 4. The ring 11 is located on a shifting ring 14. The ring 14 may be provided with a flange 15 which forms a lateral bearing for the ring 11 on the ring 14. The body portion of the ring 14 fits on the inner surface of the ring 11 to form a cylindrical bearing between the two rings. The ring 11 is placed in contact with the edge of the shell 16 so that the edge of the shell 16 forms an opposite lateral bearing on the ring 11, the rings 11, 14 and the shell 16 being secured in their relative movable and inter-bearing relation by means of the plate 17 which is secured to the shell 16 by the bolts 18. The bolts 18 extend through holes 19 formed in the plate 17 and into the tapped holes 20 formed in the shell 16.

The plate 17 has a slotted sleeve 25 that protrudes through the shell 16 and, consequently, extends through the rings 11 and 14. Also, the sleeve 26, which is the driven shaft of the mechanism, is connected to or formed integral with the plate 17 and extends rearwardly with respect to the internal combustion engine. The shell 16 being bolted to the plate 17, by the bolts 18, is held concentric together with the plate 17 and the sleeves 25 and 26, with the driving shaft of the engine by means of the bearing 27 and coaxially with the casing 4 by means of the closure plate 28 that closes one side of the casing 4 and it is provided with the bearings 29 located intermediate the plate 28 and the sleeve 26.

The piston links 10 are connected to ears 30 formed on the edge of the ring 11 and the arm 12 protrudes from the edge of the ring 11 and by shifting the ring 11 relative to the axis of rotation of the driving shaft and of the sleeves 25 and 26, the eccentricity of the points of connection of the pistons relative to the axis of rotation of the driven shaft will be varied. This change of location of the points of connection of the pistons with the ring 11 relative to the axis of the driven shaft, namely, the sleeve 26, causes variations in the lengths of strokes of the pistons 6 in their rotation about the axis of the driven shaft and the driving shaft. The location of the points of connection of the links of the pistons relative to the coaxially located driving shaft and driven shaft is produced by means of a bar 35 located within the sleeve or driven shaft 26, and which is provided with a pair of racks 36 that operate upon a pair of pinions 37 which are keyed to screws 38 that are rotatably supported in recesses 39 formed in a boss 40. The boss 40 is located on the inside surface of the plate 17 and formed integral therewith. One end of each screw 38 is located in a threaded socket 41 formed in an inwardly extending block that forms a part of the ring 14 and the other end of each screw 38 is located in a weighted block 42. The block 42 has a considerable mass in order to counterbalance the displacement of the ring 11 with reference to the axis of rotation so that when the ring 11 is shifted in one direction, the block 42 will be moved in the opposite direction to counterbalance the mass of the ring that has been displaced with reference to the axis of rotation of the driven shaft. Each of the screws 38 have right and left hand threads in order to move the ring 11 in one direction relative to the axis of the driven shaft and to move the block 42 in an opposite direction so as to be actuated to move the said parts without binding one relative to the other by rotation of the pinions 37 which mesh with the racks 36 located on opposite sides of the bar 35. The ring 11 and the counterbalancing block 42 are shifted one relative to the other and relative to the axis of the driven shaft by movement of the bar 35 which rotates the pinions 37. The movement of the bar 35 towards the driving shaft causes the center of the ring 11 to move towards the axis of the driven shaft while movement of the bar 35 rearwardly, that is, away from the engine, causes the center of the ring 11 to move outwardly and as it is moved outwardly to increase the eccentricity of the ring and the points of connection with the links of the pistons. The sockets 41 are formed in inwardly projecting lugs 45 that are located substantially in parallel relation to each other. The ring 14, and consequently the ring 11, which surrounds the ring 14, are guided by flanges 46 located on the inside surface of the plate 17, also the block 42 is guided by the flanges 47. Also, the ring 14 is guided relative to the plate 17 by the flanges 47 and the sectors 48. The block 42 may be provided with a semi-circular shaped enlargement 50 which is located intermediate the sectors 48 and the inner edges of the flanges 47 and the bottom 51 of the shell 16, in order to increase the weight of the block 42 for counterbalancing purposes. When, therefore, the bar 35 is moved to cause rotation of the pinions 37, the edges of the rings 11 and 14 move across the edge of the shell 16 and also the edge of the closure plate 17 that encloses the rings and their controlling parts within the shell 16.

In order to yieldingly pin the parts together, the springs 52 and 53 may be located one intermediate the stud 54 formed on the ring 14, and the stud 55 formed on one side of the sleeve 25, and the other is located intermediate the stud 56 formed on the opposite side of the sleeve 25 and the block 42 wherein it is suitably socketed. The spring 52 operates to resiliently counteract the pressure produced on the pistons and also takes up any slack, while the spring 53 operates to yieldingly hold the counterweight in position and prevent rattling and vibration.

The bar 35 may be connected by any suitable device that will cause it to shift longitudinally when it is desired to vary the relation of the pistons 6 in the cylinders 5. In the form of construction shown the bar 35 is actuated by a lever 60 which is swiveled in a bearing 61 secured to the top of the casing 62 and whereby the lever 60 may be moved in a longitudinally extending plane and also a transversely extending plane. The lever 60 has a cam sector gear 63 which operates on a complementary cam sector gear 64. The gear 64 is rotatably located on the shaft 65 which is supported in suitable bearings formed in the casing 62. A pin 66 is connected to the sector gear 64 and in the path of the pin 66 is located a pair of arms 67 that are connected to a sleeve 68 that is keyed to the shaft 65. The arms 67 extend to opposite sides of the driven sleeve 26 in which the bar 35 is located. The arms 67 are connected to the bar 35 which is located within the driven shaft 26. This connection may be made by any suitable means. In the particular form of construction where the parts are filled with a liquid, the connection is made through a telescoping sleeve 68 which covers the slots 69 through which a pin 70 extends. The pin 70 extends through the bar 35 as well as the slots 69 and the arms 67 operate on the pin 70 to move the bar 35. Preferably, the pin 70 is located in a flange 71 which is provided with suitable plugs 72 to prevent the escape of the liquid about the surfaces of the ends of the pin 70. Since the shaft 26 is rotated by the engine, while the arms 67 are relatively stationary, except as they move in longitudinally extending planes, ball bearing 73 may be located intermediate the ends of the arms 67 and the flange 71. Thus movement of the arms 67 will be communicated to the bar 35. This movement, however, is towards the engine and the reverse movement is obtained by means of the spring 74. The spring 74 is a pyramidal convolute spring which enables the turns of the spring to be compressed within the area of the circle of the larger turn. The smaller turn of the spring is formed on the end which is located in contact with the flange 71 while the larger end is located in contact with the plate 75 that is secured to a hub 76 located on the closure plate 28. The plate 75 may be provided with a projecting central portion 77, and the boss 76 may be provided with a recess for containing packing material 78. The plate 75 is connected to the hub 76 by means of the screws 79 which will also cause the projecting portion of the plate to be forced against the packing material 78 located in the recess formed in the hub 76. This will prevent the escape of the liquid about the surface of the driven shaft 26. Also, the sleeve 68 may be sealed from escape of the liquid from the slots 69 and the inner surface of the sleeve 68 by means of the packing rings 81 located on the ends of the sleeve 68 and fitting the surface of the driven shaft 26.

The bar 35 may also be operated by means of the pedal lever 85 to longitudinally shift the bar 35 forwardly, that is, towards the engine. The pedal lever 85 is supported on the end of the shaft 65 where it protrudes to the outside of the casing 62 and its movement relative to the shaft 65 is limited by suitable stops located intermediate on the pedal lever 85 and a part that may be connected to and formed integral with the shaft 65. A collar 86 is keyed to the end of the shaft 65. The collar 86 is provided with a recess 87 and the pedal lever 85 is provided with a projection 88 that extends within the recess 87 on the collar 86. The end surfaces 89 of the recess 87 limit the movement of the projection 88 within the recess 87 and, consequently, limit the movement of the pedal lever 85 relative to the shaft 65 whereby the lever 60 may operate the sector cam gear 63 on the shaft 65 and cause the arms 67 to be moved by the engagement of the pin 66 with the arms without movement of the pedal lever. Both the arms 67 are connected to the shaft 65 by the pins that pass through the interconnecting sleeve 68. Thus the cam gear 63 may operate the arms 67 without movement of the pedal 85 through an arc as determined by the length of the recess 87 in which the projection 88 of the pedal lever 85 is located. When, however, the arms 67 have been moved to a certain position, and consequently the bar 35 has been moved to a corresponding position, by the operation of the lever 60, the arcuate movement of the ends of the arms 67 where they engage the flange 71 may be completed by the movement of the pedal lever 85, if desired, the projection 88 operating to engage one of the end surfaces 89 of the recess 87 and further rotate the shaft 65 in the same direction. Also, when the lever 60 has been moved so as to allow the spring 74 to move the bar in the opposite direction, that is, away from the engine, the pedal lever 85, when operated, moves the bar 35 again towards the engine. The lever 60 may be locked in any position in which it may be located if desired, by means of a suitable dog 93 that engages a ratchet 94. The dog 93 may be operated by a suitable push button 95 that is connected to the dog by a rod 96 that passes through the lever 60.

The lever 60 may also be used to operate a reverse gear mechanism 100 located in one end of the casing 62. The driven shaft 26 is a jointed shaft, it having the shaft part 101 which has an end portion that projects into the sleeve or driven shaft 26 and a clutch gear 102 is keyed to the driven shaft 26. A slip gear 103, being a coactuating clutch part, is moved along the shaft 101 by means of a bar 104 and a fork 105. The fork 105 is connected to the gear 103 to permit rotation of the gear 103 relative to the fork and the bar 104. The gear 102 is in mesh with a gear 106 located on a shaft 107 that is supported in the walls of the casing 62. The shaft 107 has a gear 108 that operates on an idler 109. The idler 109 is supported on a stub shaft 110. When the gear 103 is shifted away from its clutch relation with respect to the gear 102, it meshes with the gear 109 and the transmission from the driven shaft 26 to the driven shaft 101 is through the gears 106 and 108, and the idler 109 to the gear 103 which causes the driven shaft 101 to rotate in the direction opposite to that in which the driven shaft 26 is rotated by the engine.

The shifting of the clutch gear 103 from the coactuating clutch gear 102 may be performed by the lever 60. The movement of the lever 60 from its position to actuate the arms 67 is guided by means of a U-slot 115. When the lever 60 is located in the portion 116 of the U-slot 115, its movement will be such as to control the position of the arms 67 once such position has been previously determined by the operation of the pedal lever 85, that is, if the pedal lever 85 has moved the arms 67 beyond the point where they can be further actuated by the lever 60. When, however, the lever 60 is shifted transversely through the portion 117 of the U-slot 115, so as to be located in the portion 118 of the U-slot 115, it engages the bar 104. This engagement is through a lock 120 which engages in the notch 121 formed in the bar 104. This interengagement occurs when the lever 60 is swung in a plane at right angles to the axis of the driven shaft on the swivel in the bearing 61. Upon movement of the lever 60 along the portion of the slot 118, the bar 104 will be moved rearwardly, that is, away from the engine so as to move the gear 103 along the end of the shaft 101 and cause it to mesh with the idler 109 which will produce reverse rotation of the driven shaft 101.

In the operation of the transmission and clutch mechanism shown in the drawing, assuming that the engine is idling, that is, not operating the driven shaft 26, the rings 11 and 14 will be concentric with the driving shaft 2 and the driven shaft 26, since in this position the pistons 6 will be located equidistant from the axes of the inter-related shafts and casing 4, the pistons 6 and the rings 11 and 14 will rotate about the axis of the shaft 26, the ring 11 sliding on the ring 14. This will correspond to the releasement of the clutch in an ordinary transmission mechanism, such as found in the automobile, from connection with the crank shaft of the engine. When, therefore, it is desired to transmit power from the engine to the driven shaft the bar 35 is shifted so as to cause a displacement of the center of the ring 14 from the axis of the driven shaft 26. This likewise displaces the center of the ring 11 and also the relation of the pistons 6 relative to their cylinders 5. The rotation of the casing 4, which is connected to the crank shaft of the engine, will cause the pistons 6 to move short distances within their respective cylinders according to the degree of eccentric relation of the ring 14 established by the bar 35, relative to the driven shaft 26 as the ring 11 rotates on the ring 14. This produces a torque on the driven shaft 26 which is measured by the product of the pressure to which the pistons are subjected to by the movement of the liquid filled casing 4 and the cylinders 5 in which the pistons 6 are located and the degree of eccentricity of the ring 14 to the axis of the driven shaft 26, that is, the distance between the axis of the driven shaft 26 and the center of the ring 14 to which it is moved by the operation of the bar 35. This degree of eccentricity of the rings 14 and 11, will depend upon the extent to which the bar 35 is moved by the operation of the spring 74 and as limited by the lever 60 or the pedal 85. The spring 74 tends to position the ring 14 at the position of maximum eccentricity relative to the axis of the driven shaft and consequently to produce the maximum stroke of the pistons 6 within the cylinders 5 in which position the eccentricity of the ring is such that one of the pistons 6 will be located in contact with the end of one of the cylinders and further movement of the pistons relative to the cylinders will be discontinued. When the ring 14 is in this position the driven shaft is, in the vernacular of power transmission, directly connected with the engine. At positions intermediate the concentric and the maximum eccentric relations, the pistons will move in the cylinders and produce movement of the oil in the cylinders and through or by the pistons, or both through and by the pistons, to transmit power to the driven shaft 26 according to resistance of the oil movement.

The spring 74 operates automatically against the resistance to change the position of the ring 11 to increase the speed of the driven shaft 26 when the lever is swung forward. Thus the mechanism is particularly adapted for automobile driving since it will automatically increase the speed of the car as the engine can carry the load.

Thus the speed of the driven member of a car, if the mechanism is mounted in an automobile, will be varied according to the amount of work that is to be done. In case of an automobile, it will be varied according to work done in moving the car over the road, the work being done in changing the momentum of the car by reason of its inertia or driving it up a hill or doing other work. The transmission device thus affords a means whereby very slight variations in the work done in moving the driven member may be obtained and very slight variations of speed, may likewise be obtained.

The bar 35 is operated by the arms 67 which engage the flange 71 which is connected to the bar 35 by means of the pin 70. The arms 67 are keyed to the shaft 65 and are operated by the cam sector gear 64, the pin 66 engaging the arms 67. The cam sector gear 64 is operated by the cam sector gear 63 which is connected to the lever 60. The cam sector gear 63 has a greater radius at its rear edge than at its forward edge while the reverse is true of the cam sector gear 64, so that the rearward movement of the arms 67 will be at a greater rate at the beginning of such movement from the position shown in Fig. 1 of the drawings when the lever 60 starts to move forwardly than at the completion of the stroke of the lever when the forward edges of the cam sector gears 63 and 64 are in approximate alignment with each other. The cam sector gears 63 and 64 enable the operator, not only to maintain the control of the power transmitted from the engine, but also enable a quicker movement of the bar 35 upon a given forward angular movement of the lever 60 and a consequent more rapid movement of the bar 35 and a more rapid movement of the ring 14 away from the axis of the driven shaft which enables the rapid increase of movement of the driven shaft in relation to the driving shaft of the engine and, consequently, a quick "get-away" in the terms of automobile driving.

If it is desired to reverse the rear portion of the driven shaft relative to the forward portion of the driven shaft, or sleeve, all that is necessary is to press the pedal lever 85 down, which moves the bar 35 forwardly so as to locate the center of the ring 14 and consequently the center of the ring 11 in the axis of the driven shaft 26. Then the lever 60 may be moved rearwardly so that it may be shifted through the portion 117 of the slot 115 and into the portion 118, whereupon the lug 120 will engage with the notch 121 in the bar 104 and move the gear 103 out of its clutch engagement with the gear 102 into driving engagement with the idler 109 whereupon the portion of the driven shaft 101 will rotate in the reverse direction when the pedal 85 is released. The extent of its rearward movement, and consequently the extent of the rearward movement of the bar 35, may be controlled by the extent of the releasement of the pedal 85 and its movement by the spring 74.

To provide a means for using a self-starter mechanism, the closure plate 28 may have a flange 130 extending outwardly from its periphery. The flange 130 is of such width that the usual ring gear 131 may be placed thereon and the teeth 132 of the gear 131 may be operated on by the pinion of the starter without clashing of the pinion against the cylinders 5 of the casing 4. In starting the motor, the lever 60 is placed in a neutral position, that is, so as to locate the center of the ring 11 in the axis of the driven shaft 26. When the ring 11 is so positioned relative to the shaft 26, rotation of the ring 131 by the starter will cause the casing 4 to be rotated and also the crank shaft 2 of the motor since the casing 4 and the shaft 2 are secured together.

Thus my invention provides a means whereby speed change may be made at any time irrespective of the speed of the driven or driving members and also a means for automatically increasing the speed to the limit of the speed as determined by the speed of the driving member. Also gears for variation of speed ratio are eliminated and the numbers of parts in transmission devices are greatly reduced.

I claim:

1. In a transmission mechanism, a casing having a plurality of cylinders for containing a fluid, a plurality of pistons located in the cylinders, a slip ring connected to the pistons, a counterbalancing weight for counterbalancing the moment of inertia of the pistons, and a threaded member for shifting the slip ring and the counterbalancing weight in opposite directions.

2. In a transmission mechanism, a casing having a plurality of cylinders for containing a fluid, a plurality of pistons, a slip ring connected to the pistons, a driven member operated by the pistons, a counterbalancing weight for counterbalancing the moment of inertia of the pistons, a threaded member for shifting the slip ring and the counterbalancing weight in opposite directions and away from the axis of rotation of the driven member, a rack and pinion for operating the threaded member, and means for shifting the rack.

3. In a transmission mechanism, a casing having a plurality of cylinders for containing a fluid, a plurality of pistons, a slip ring connected to the pistons, a driven member operated by the pistons; a counterbalancing weight for counterbalancing the moment of inertia of the pistons, a threaded member for shifting the slip ring and the counterbalancing weight in opposite directions and away from the axis of rotation of the driven member, a pinion for rotating the threaded member, a rack located substantially in the axis of rotation of the driven member for operating the pinion and means for operating the rack.

4. In a transmission mechanism, a casing having a plurality of cylinders for containing a fluid, a slip ring, a plurality of pistons connected to the slip ring, a driven member operated by the pistons, a counterbalancing weight for counterbalancing the moment of inertia of the pistons, a threaded member for shifting the slip ring and the counterbalancing weight in opposite directions and away from the axis of rotation of the driven member, a pinion for rotating the threaded member, a rack located substantially in the axis of rotation of the driven member for operating the pinion, a spring for operating the rack in one direction and a lever for operating the rack in the opposite direction against the tension of the spring.

5. In a power transmission, a driving member and a driven member, a container for containing a liquid and connected to one of the members and rotatable therewith, a body located within the container and eccentrically connected to the other member to move the body within the container, a counterbalancing weight for counterbalancing the moment of inertia of the body and means for varying the eccentricity of the connection of the body with its connected member.

6. In a transmission mechanism, a driven member, a casing having a plurality of cylinders for containing a fluid, a plurality of pistons located in the cylinders, a slip ring connected to the pistons, a counterbalancing weight for counterbalancing the moment of inertia of the pistons, means for shifting the slip ring and the counterbalancing weight in opposite directions and away from the axis of rotation of the driven member, and a pair of springs counteracting each other for securing the counterbalancing weight and the shifting means as against vibration.

In witness whereof I have hereunto signed my name to this specification.

FREDRICK J. FAHLE.